United States Patent
Geens et al.

(10) Patent No.: US 9,958,631 B2
(45) Date of Patent: May 1, 2018

(54) OPTICAL FIBER DISTRIBUTION SYSTEM WITH STAGGERED CABLE GUIDES

(71) Applicant: CommScope Connectivity Belgium BVBA, Kessel-lo (BE)

(72) Inventors: Johan Geens, Bunsbeck (BE); Pieter Vermeulen, Westerlo (BE); Eric Marcel M Keustermans, Houwaart (BE); Lodewijk Van Noten, Leuven (BE)

(73) Assignee: CommScope Connectivity Belgium BVBA (BE)

( * ) Notice: Subject to any disclaimer, the term of this patent is extended or adjusted under 35 U.S.C. 154(b) by 0 days. days.

(21) Appl. No.: 14/901,497

(22) PCT Filed: Jun. 27, 2014

(86) PCT No.: PCT/EP2014/063717
§ 371 (c)(1),
(2) Date: Dec. 28, 2015

(87) PCT Pub. No.: WO2014/207210
PCT Pub. Date: Dec. 31, 2014

(65) Prior Publication Data
US 2016/0370553 A1    Dec. 22, 2016

Related U.S. Application Data

(60) Provisional application No. 61/840,835, filed on Jun. 28, 2013, provisional application No. 61/986,539, filed on Apr. 30, 2014.

(51) Int. Cl.
*G02B 6/00* (2006.01)
*G02B 6/44* (2006.01)

(52) U.S. Cl.
CPC ......... *G02B 6/4471* (2013.01); *G02B 6/4452* (2013.01); *G02B 6/4478* (2013.01)

(58) Field of Classification Search
USPC ........................................................ 385/135
See application file for complete search history.

(56) References Cited

U.S. PATENT DOCUMENTS

| 5,339,379 A | 8/1994 | Kutsch et al. |
| 6,256,444 B1 | 7/2001 | Bechamps |

(Continued)

FOREIGN PATENT DOCUMENTS

| EP | 2 450 729 | 5/2012 |
| JP | 2000-286574 | 10/2000 |

(Continued)

OTHER PUBLICATIONS

International Search Report and Written Opinion for International Application No. PCT/EP2014/063717 dated Sep. 26, 2014 (12 pages).

*Primary Examiner* — Eric Wong
(74) *Attorney, Agent, or Firm* — Merchant & Gould P.C.

(57) ABSTRACT

A cable management structure (100, 200, 300) for an optical fiber distribution rack (10) is disclosed. In one aspect, the cable management structure (100) supports cables extending from an optical fiber distribution element (50) supported by the rack (10). In one embodiment, a plurality of first cable support guides (102*a*) are vertically aligned along a first plane (190) while a plurality of second cable support guides (102*b*) are vertically aligned along a second plane (192). As presented, the first cable support guides (102*a*) are offset from the second cable support guides (102*b*) such that the first plane (190) is horizontally recessed from the second plane (192). In one embodiment a side channel frame (130) is provided to support the cable support guides (102). In another embodiment, the optical fiber distribution element (Continued)

(50) is provided with linearly spaced mounting arrangements (60) configured for engagement with cable support guides (202, 302).

9 Claims, 15 Drawing Sheets

(56) References Cited

U.S. PATENT DOCUMENTS

| | | |
|---|---|---|
| 6,504,988 B1 | 7/2003 | Trebesch et al. |
| 6,870,734 B2 | 3/2005 | Mertesdorf et al. |
| 7,079,744 B2 | 7/2006 | Douglas et al. |
| 7,086,539 B2 | 8/2006 | Knudsen et al. |
| 7,171,099 B2 | 1/2007 | Barnes et al. |
| 8,315,498 B2 | 11/2012 | Redmann et al. |
| 9,081,164 B2 | 7/2015 | Badar et al. |
| 9,128,262 B2 | 9/2015 | Campbell et al. |
| 9,435,975 B2 | 9/2016 | Ott |
| 2002/0131750 A1 | 9/2002 | Holman |
| 2006/0093302 A1 | 5/2006 | Solheid |
| 2009/0245746 A1* | 10/2009 | Krampotich ......... G02B 6/4455 385/135 |
| 2011/0228473 A1* | 9/2011 | Anderson ............ G02B 6/4452 361/679.58 |

FOREIGN PATENT DOCUMENTS

| | | |
|---|---|---|
| WO | WO 2011/100616 | 8/2011 |
| WO | WO 2012/068013 | 5/2012 |
| WO | WO 2014/118227 | 8/2014 |
| WO | 2014/173896 A1 | 10/2014 |
| WO | 2014/173930 A1 | 10/2014 |
| WO | 2015/055586 A1 | 4/2015 |
| WO | 2016/012550 A2 | 1/2016 |
| WO | 2016/156611 A1 | 10/2016 |

\* cited by examiner

FIG. 4
FIG. 5
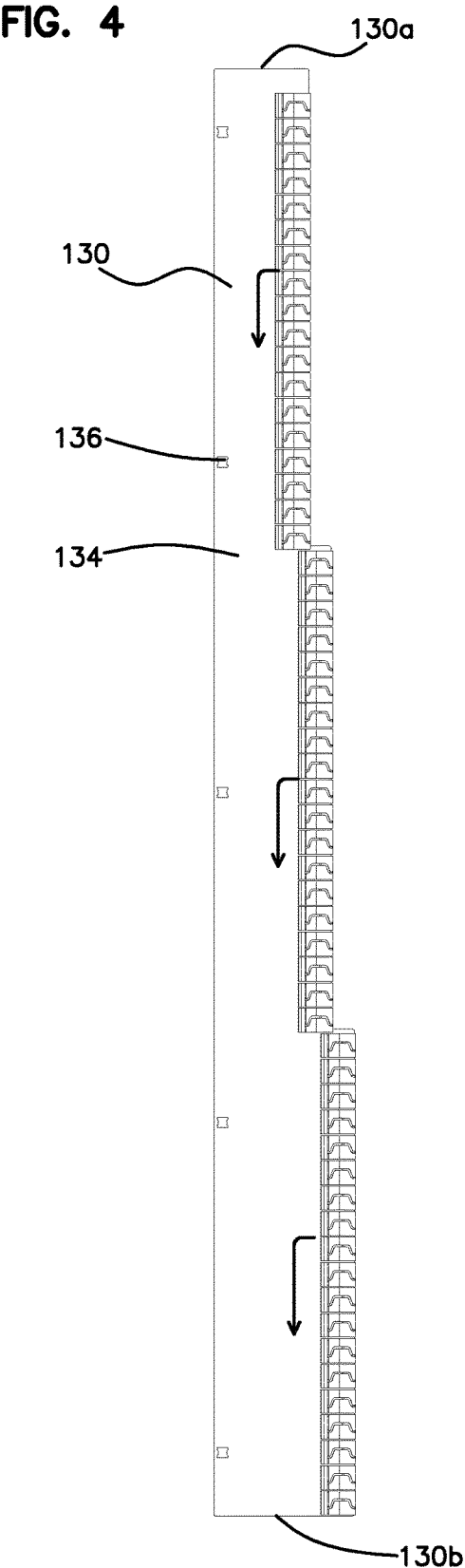
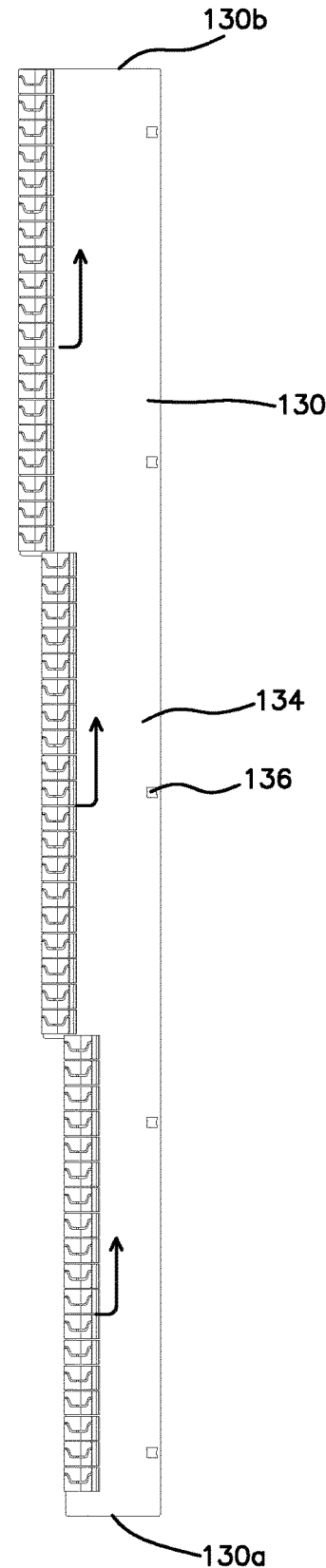

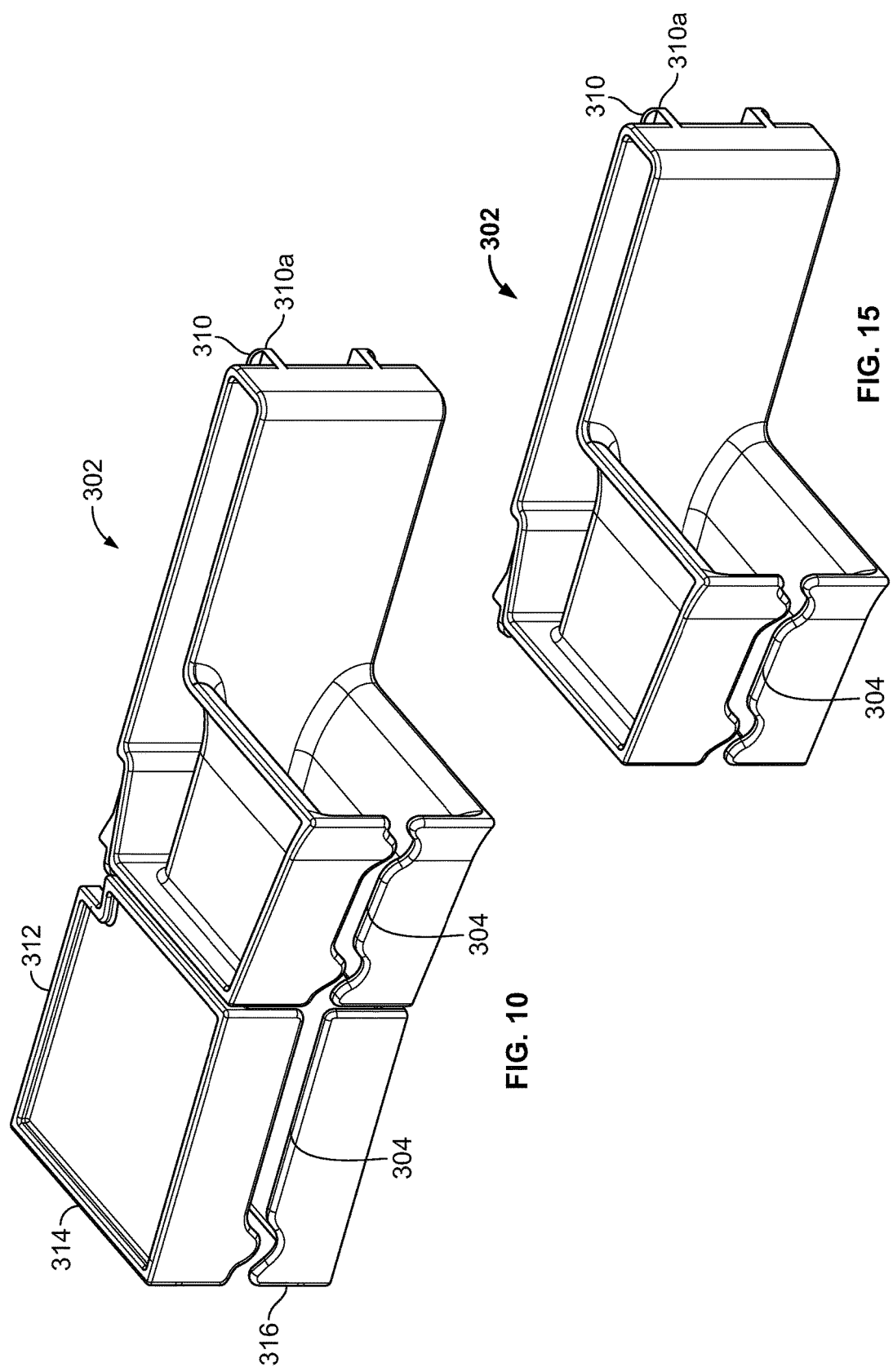

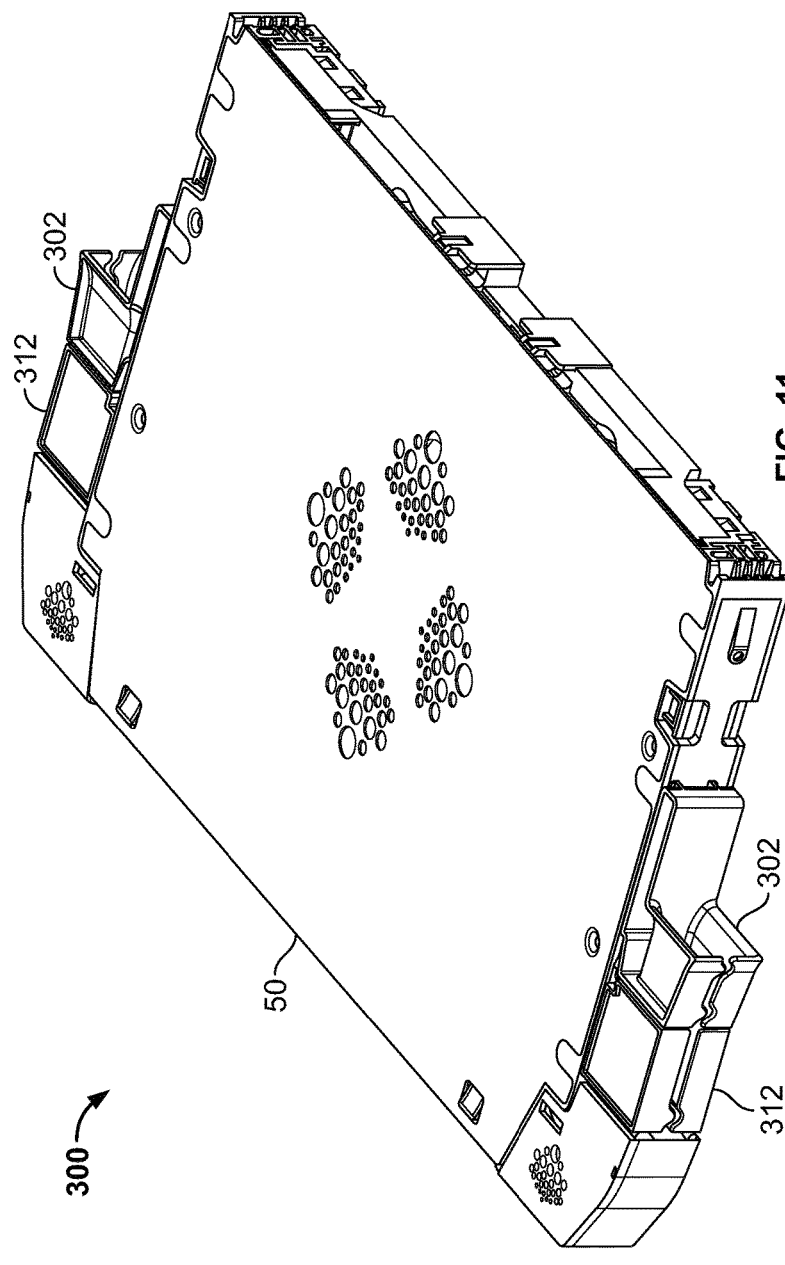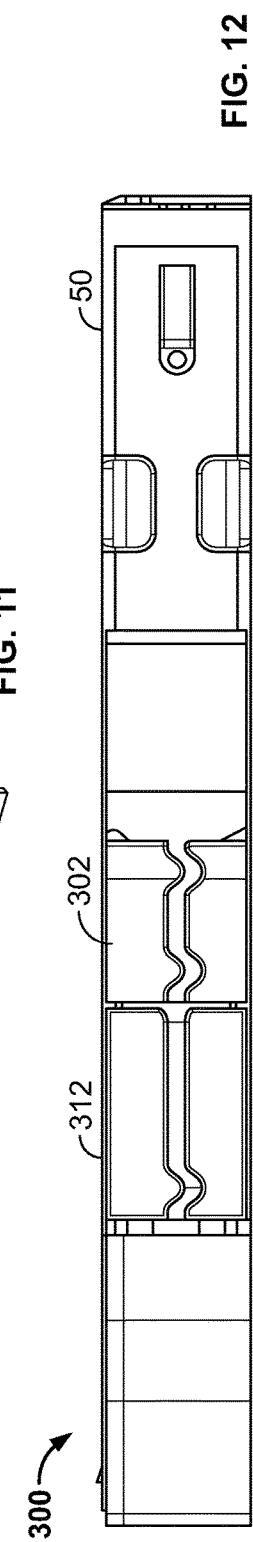

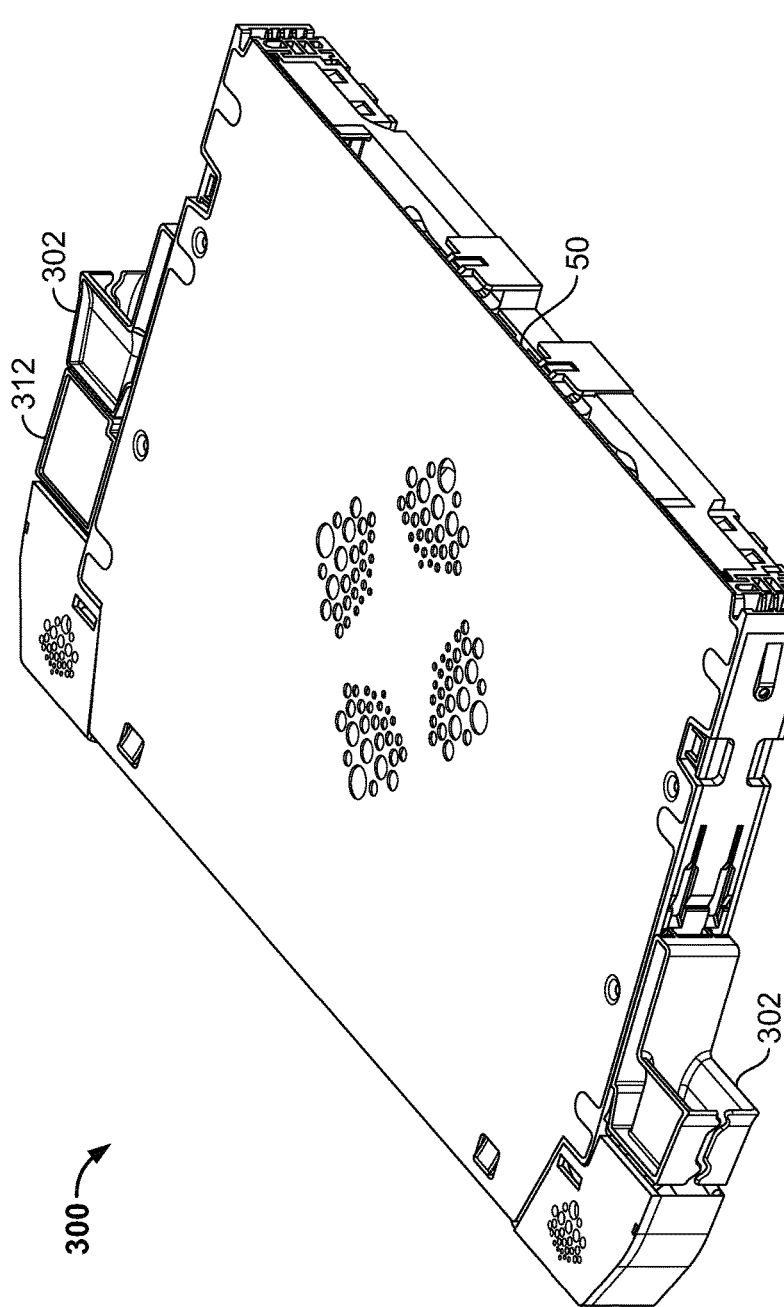
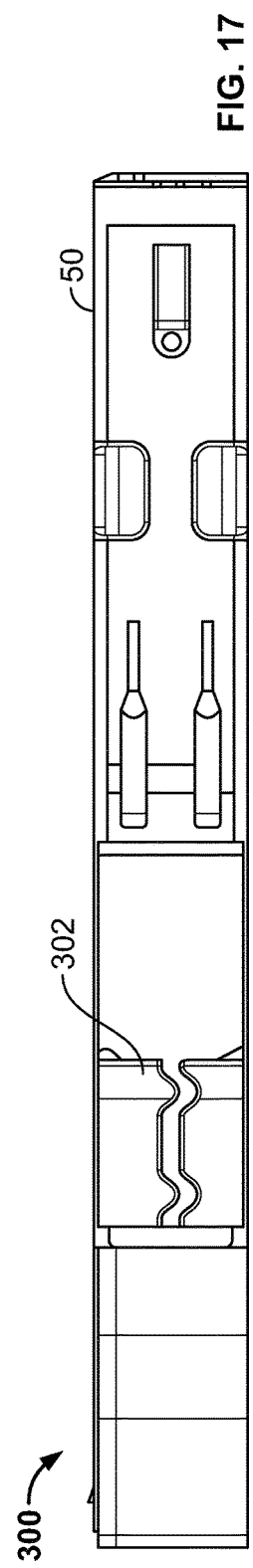

OPTICAL FIBER DISTRIBUTION SYSTEM WITH STAGGERED CABLE GUIDES

CROSS-REFERENCE TO RELATED APPLICATION(S)

This application is a National Stage of PCT/EP2014/063717, filed 27 Jun. 2014, which claims benefit of U.S. Patent Application Ser. No. 61/840,835 filed on 28 Jun. 2013, and to U.S. Patent Application Ser. No. 61/986,539 filed on 30 Apr. 2014, the disclosures of which are incorporated herein by reference in their entireties. To the extent appropriate, a claim of priority is made to each of the above disclosed applications.

TECHNICAL FIELD

The present invention relates to an optical fiber distribution system, including a rack, and elements which populate the rack, and including components for managing and routing optical fiber cables.

BACKGROUND

Optical fiber distribution systems include fiber terminations and other equipment which is typically rack mounted. Various concerns exist for the optical fiber distribution systems, including density, ease of use, and cable management. There is a continuing need for improvements in the optical fiber distribution area.

SUMMARY

One implementation of a system in accordance with the examples of the disclosure includes a cable management structure for an optical fiber distribution rack supporting an optical fiber distribution element, or other equipment. The cable management structure can include at least one first cable support guide and at least one second cable support guide. In one aspect, the first cable support guide defines a cable pathway extending between a front face and a rear face, wherein the front face of the at least one first cable support guide is vertically aligned along a first plane. In another aspect, the second cable support guide also defines a cable pathway extending between a front face and a rear face, wherein the front face of the at least one second cable support guide is vertically aligned along a second plane. As presented, the at least one first cable support guide is offset from the at least one second cable support guide such that the first plane is horizontally recessed from the second plane in a direction towards the rear face of the at least one first cable support guide. Such an arrangement allows for improved space utilization of the side portion of the rack where the cables extending from multiple vertically stacked and/or adjacent optical fiber distribution elements is routed.

The cable management structure may be provided with a side channel frame that is configured to support the cable support guides. In one embodiment, the side channel frame is configured with mounting arrangements that can engage with corresponding engagement features on the cable support guides. In another embodiment, the optical fiber distribution element is provided with linearly spaced mounting arrangements that are configured to engage with engagement features on the cable support guides. With either approach, the cable support guides can be offset from each other in a grouped and staggered configuration to allow for cables extending along the height of the rack to be more efficiently managed.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 4 is a side view of the cable management structure shown in FIG. 1.

FIG. 5 is a side view of an alternative orientation of the cable management structure shown in FIG. 4.

FIG. 10 is a perspective view of a further alternative embodiment of a cable management structure which includes a modified cable support guide.

FIGS. 11-14 show the cable support guide of FIG. 10 in use with an optical fiber distribution element.

FIG. 15 shows the cable support guide of FIG. 10 with an alternative structure, including an extension which is removed from the cable support guide.

FIGS. 16-19 show the cable support guide of FIG. 15 in use with an optical fiber distribution element.

DETAILED DESCRIPTION

Figure 1:
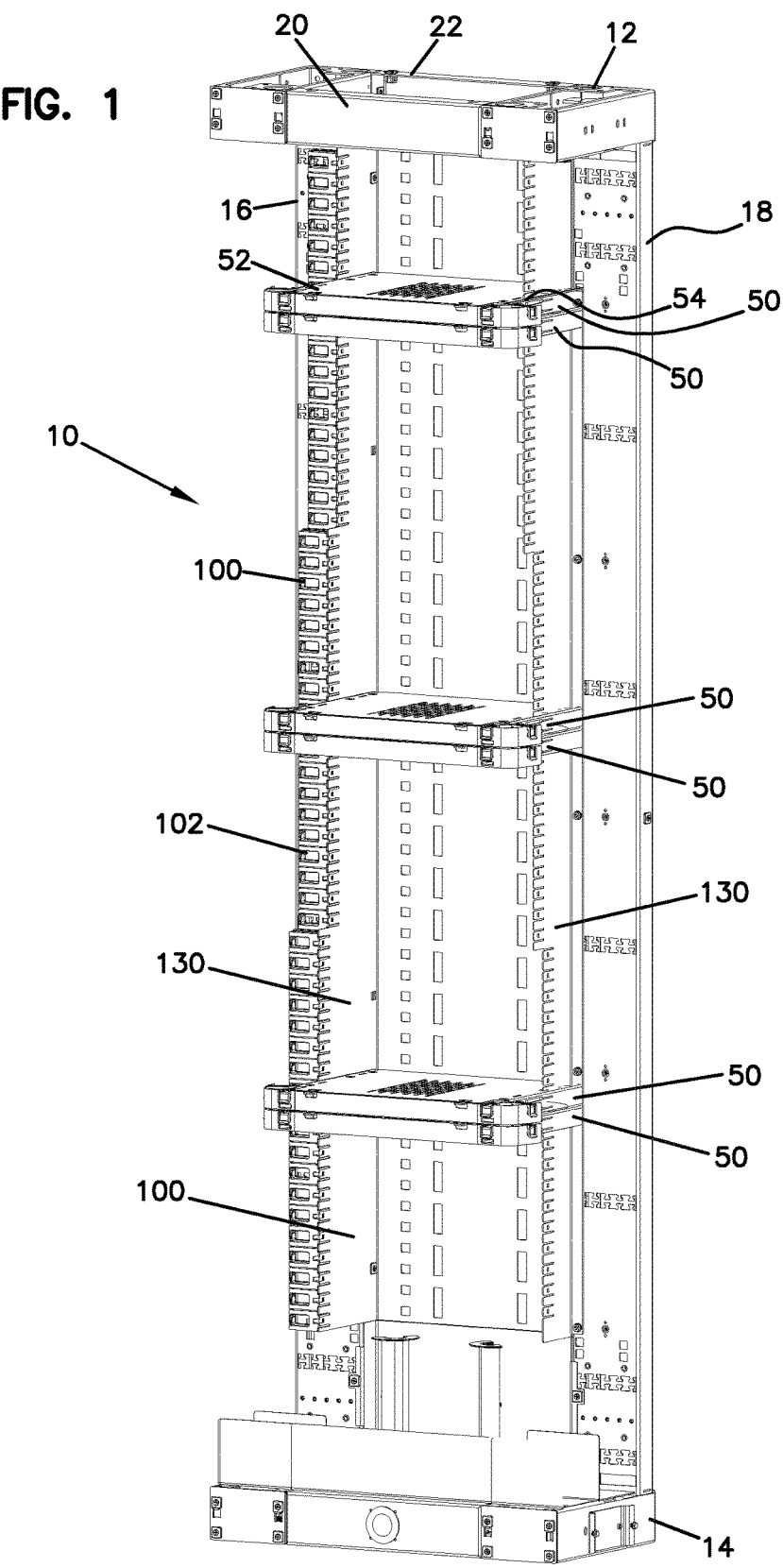
FIG. 1 is a perspective view of an optical fiber distribution rack and cable management structure having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

With reference to FIG. 1, an optical distribution frame or rack 10 is shown. In one aspect, the optical distribution frame 10 has a top portion 12, a base portion 14, a first side 16, and a second side 18. The optical distribution frame 10 is also shown as having a front side 20 and a back side 22.

Figure 2:
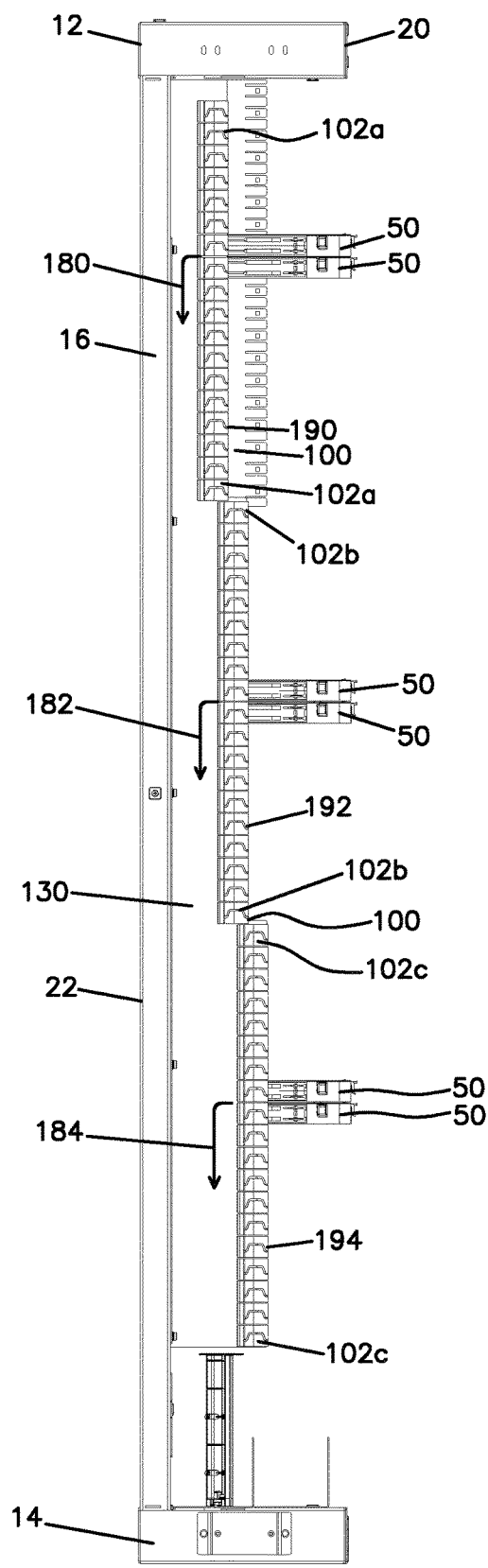
FIG. 2 is a perspective view of the optical fiber distribution rack and cable management structure shown in FIG. 1.
Figure 3:
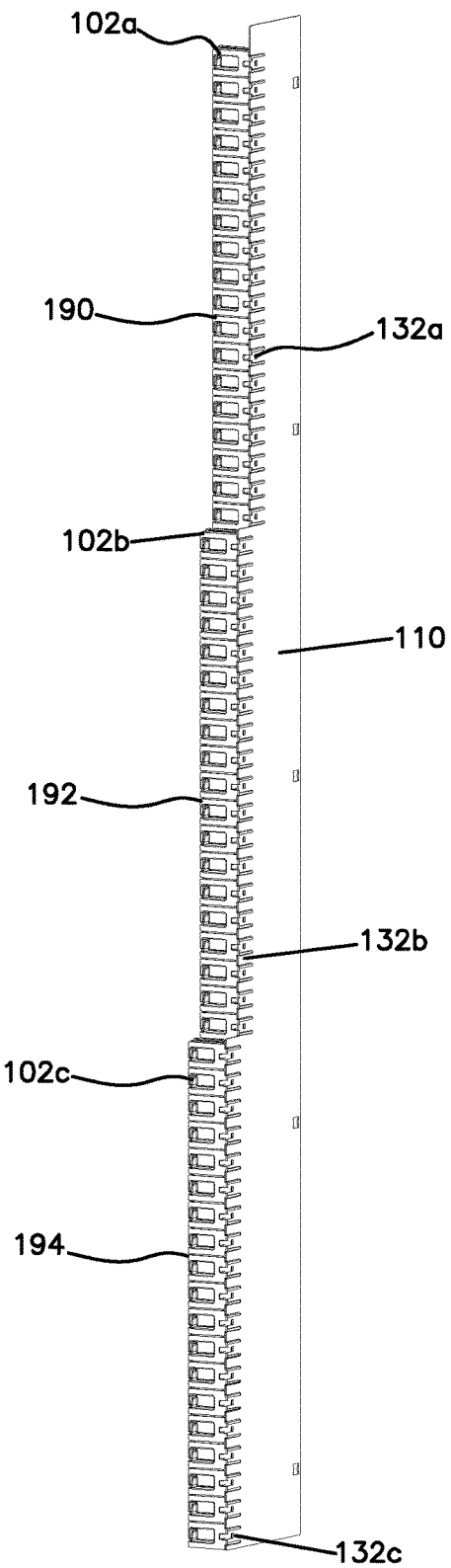
FIG. 3 is a perspective view of the cable management structure shown in FIG. 1.

In one aspect, the optical distribution frame 10 is configured to support a plurality of optical fiber distribution elements 50, such as a sliding chassis type element configured for use as a patch panel to connect patch cables entering one side of the element 50 to an incoming cable, such as a distribution cable or a feeder cable entering an opposite side of the element 50. One example of such an element 50 is described in PCT Patent Application Serial Number EP 2014/051714, filed Jan. 29, 2014, the entirety of which is hereby incorporated by reference. As shown, each optical fiber distribution element 50 is mounted to the optical distribution frame 10 near the back side 22 of the frame 10, and is provided with a first side 52 and an opposite second side 54 at which cables may enter or exit the element 50. Although there are only six distribution elements 50 shown in FIGS. 1 and 2 in vertically adjacent pairs, it is noted that fewer or more distribution elements 50 may be installed in rack 10.

The optical distribution frame 10 is also shown as being provided with one or more cable management structures 100. The cable management structures 100 provide for a staggered cable routing structure that receives cables from either the first or second side 52, 54 of each mounted optical fiber distribution element 50, and directs the cables along one of staggered pathways 180, 182, and 184. By staggering the pathways 180, 182, and 184, the number of cables that can be routed within the same footprint is increased as the available depth along the side(s) of the rack 10 is better optimized. It is noted that although three staggered pathways are shown, the cable management structure 100 can be provided with fewer or more staggered pathways, or with a single continuously sloped pathway.

As shown, the cable management structure 100 includes a plurality of cable support guides 102 that are attached to a side channel frame 130 that extends vertically between the base portion 14 and the top portion 12 of the optical fiber distribution rack 10. In the embodiment presented at FIGS. 1-7, the side channel frame 130 is provided with mounting arrangements 132 (132a, 132b, 132c) that engage with a corresponding engagement feature 110 on each of the cable support guides 102. In one aspect, the mounting arrangements 132 and engagement features 110 allow for a removable snap-fit type connection between the side channel frame 130 and cable support guides 102. For example, mounting arrangement 132 is provided with a pair of slots 130c and aperture 130d that engage with corresponding legs 110a and latch tab 110b on the cable support guide 102. However, the mounting arrangements 132 and engagement features 110 may be configured to engage each other with other types of attachment means, such as mechanical fasteners and/or permanent connection features. Additionally, the side channel frame 130 and cable support guides 102 could be formed as an integral structure.

Figure 6:
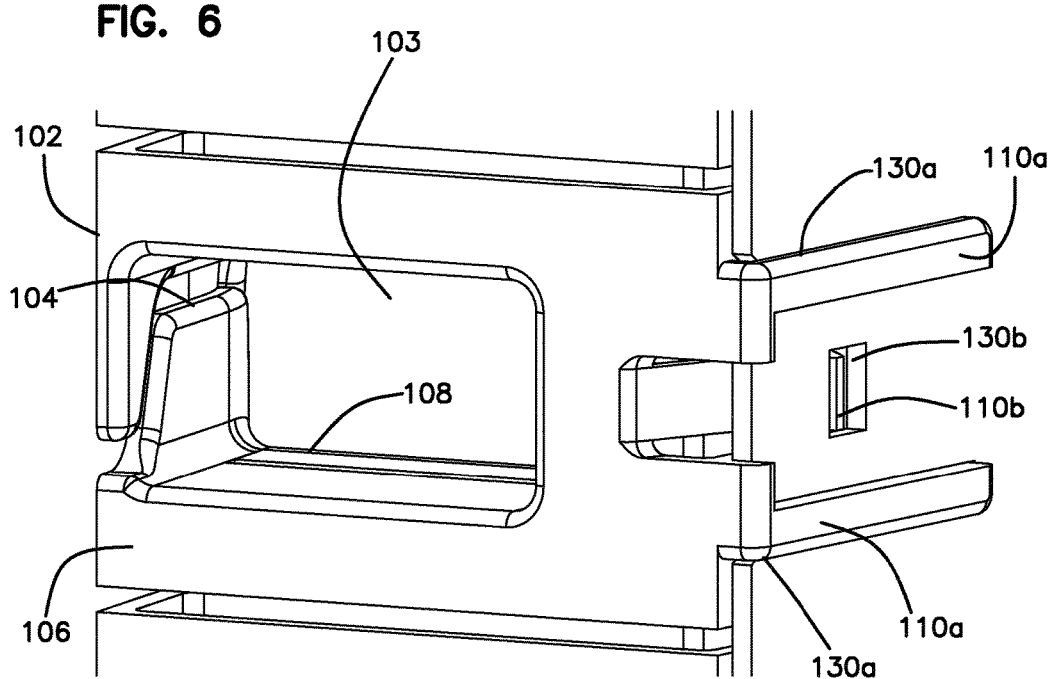
FIG. 6 is a perspective view of a portion of the cable management structure shown in FIG. 1.
Figure 7:
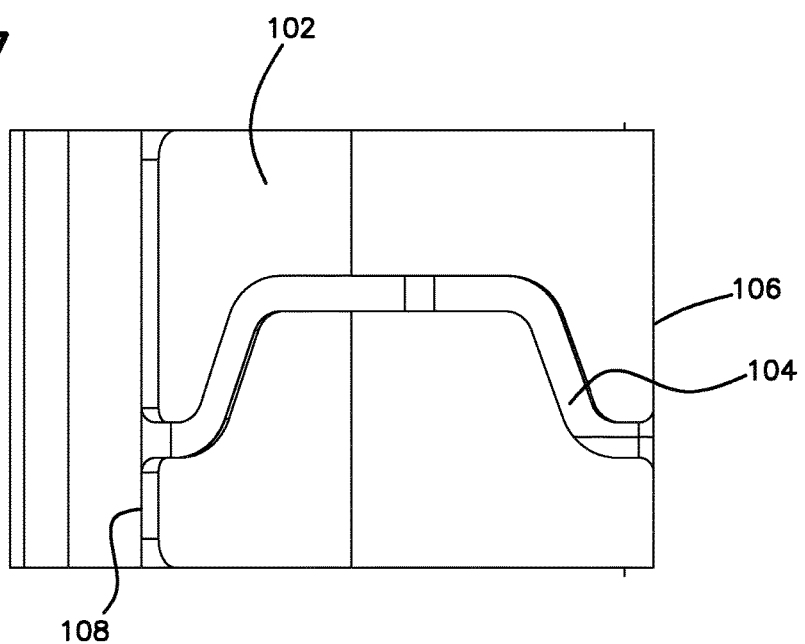
FIG. 7 is a side view of the portion of the cable management structure shown in FIG. 6.

As most easily seen at FIGS. 6 and 7, each of the cable support guides 102 is provided with a central opening 103, and a cable support pathway 104 that extends from a front face 106 to a rear face 108 of the cable support guide 102. The cable support pathway 104 receives and frictionally secures a cable (not shown) extending from the first side 52 (or the second side 54) of the optical fiber distribution element 50. In one aspect, pathway 104 is configured as a circuitous or tortuous pathway to further retain the cable within the support guide 102. The cable support pathway 104 is also configured to route the cable to one of the cable pathways 180, 182, 184 depending upon the mounting location of the cable support guide 102 with respect to the side channel frame 130.

As configured, the mounting arrangements 132 on the side channel frame 130 are provided in a plurality of staggered groups such that a plane defined by the front face 106 of the cable support guides 102 in one or more of the staggered groups is horizontally recessed in a direction towards the rear face 108 of the cable support guide 102. For example, mounting arrangements 132a are provided for a plurality of cable support guides 102a such that the front face 106 of the cable support guides 102a extends along a first plane 190. Similarly, mounting arrangements 132b are provided for a plurality of cable support guides 102b such that the front face 106 of the cable support guides 102b extends along a second plane 192 while mounting arrangements 132c are provided for a plurality of cable support guides 102c such that the front face 106 of the cable support guides 102c extends along a third plane 194. As shown, the first plane 190 is horizontally recessed from the second plane 192 while the second plane 192 is in turn horizontally recessed from the third plane 194. Accordingly, cables extending through the first group of cable support guides 102a are routed along the first cable pathway 180, cables extending through the second group of cable support guides 102b are routed along the second cable pathway 182, and cables extending through the third group of cable support guides 102c are routed along the third cable pathway 182. As stated previously, this configuration allows for the cables to be grouped together and oriented in a manner that takes advantage of the available depth of the distribution rack 10.

Referring to FIGS. 4 and 5, the side channel frame 130 is defined as having a main body 134 extending between a first end 130a and a second end 130b. In one aspect, the main body 134 can act to separate the cables in the pathways 180, 182, 184 from the optical fiber distribution elements 50. The side channel frame 130 main body 134 can also be provided with a plurality of mounting holes 136 for securing the side channel frame 130 to the optical fiber distribution rack, for example, with mechanical fasteners.

Still referring to FIGS. 4 and 5, it can be seen that the side channel frame can be rotated or oriented such that either end 130a, 130b is in an upward position relative to the optical fiber distribution rack 10. The orientation of FIG. 4 is similar to that shown for the side channel frame 130 located nearest to the first side 16 of the optical fiber distribution rack 10 while the orientation of FIG. 5 is similar to that shown for the side channel frame 130 located nearest to the second side 18 of the optical fiber distribution rack 10. Accordingly, the orientation shown in FIG. 4 allows for cables to be routed from the cable support guides 102 downwardly in the cable routing pathways 180, 182, 184 towards the base portion 14 of the optical fiber distribution rack 10. Such a configuration is beneficial when, for example, the cables are distributed beneath the floor supporting the optical fiber distribution rack 10. In contrast, the orientation shown in FIG. 5 allows for cables to be routed from the cable support guides 120 upwardly in the cable routing pathways 180, 182, 184 towards the top portion 12 of the optical fiber distribution rack 10. Such a configuration is beneficial when, for example, the cables are distributed at a level above the optical fiber distribution rack 10.

Figure 8:
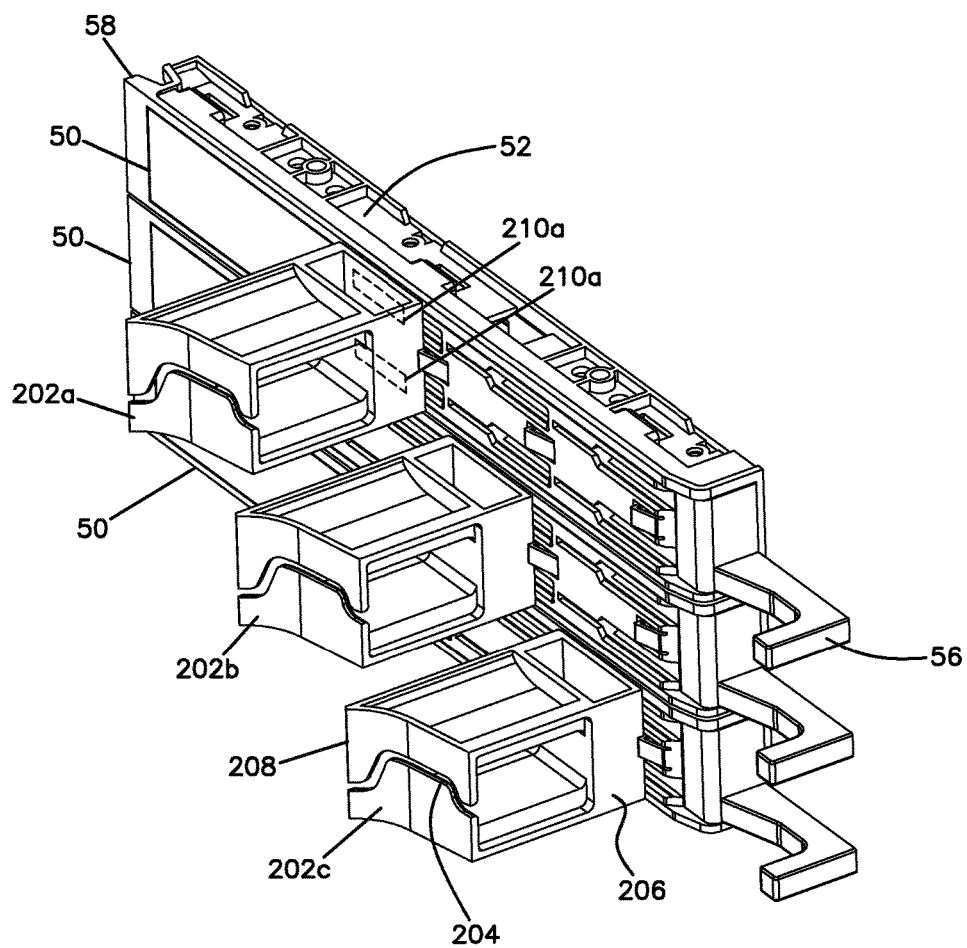
FIG. 8 is a perspective view of an alternative embodiment of a cable management structure.
Figure 9:
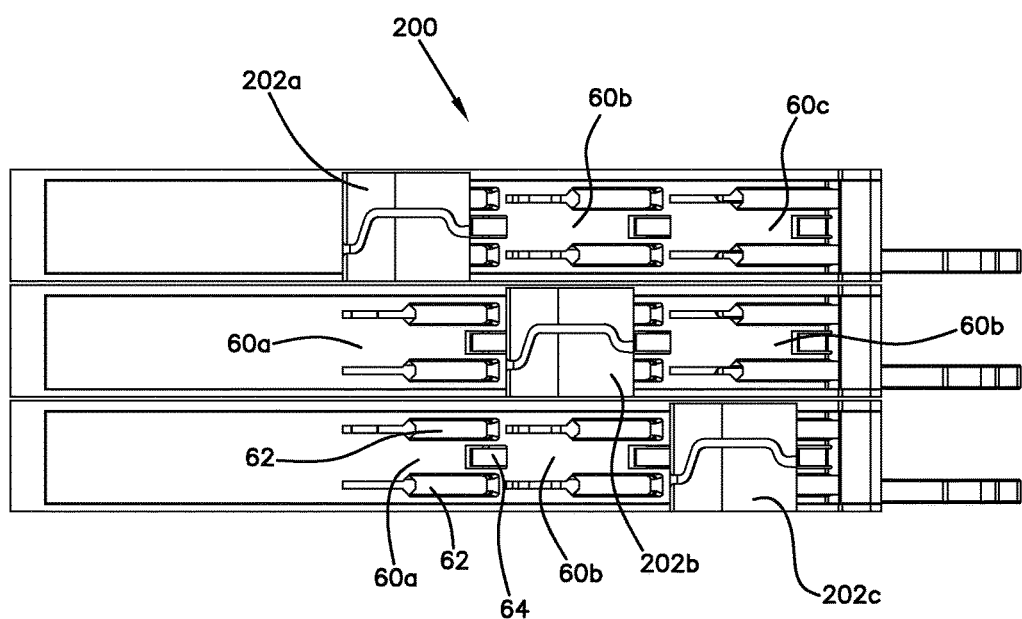
FIG. 9 is a side view of the cable management structure of FIG. 8.
Figure 13:
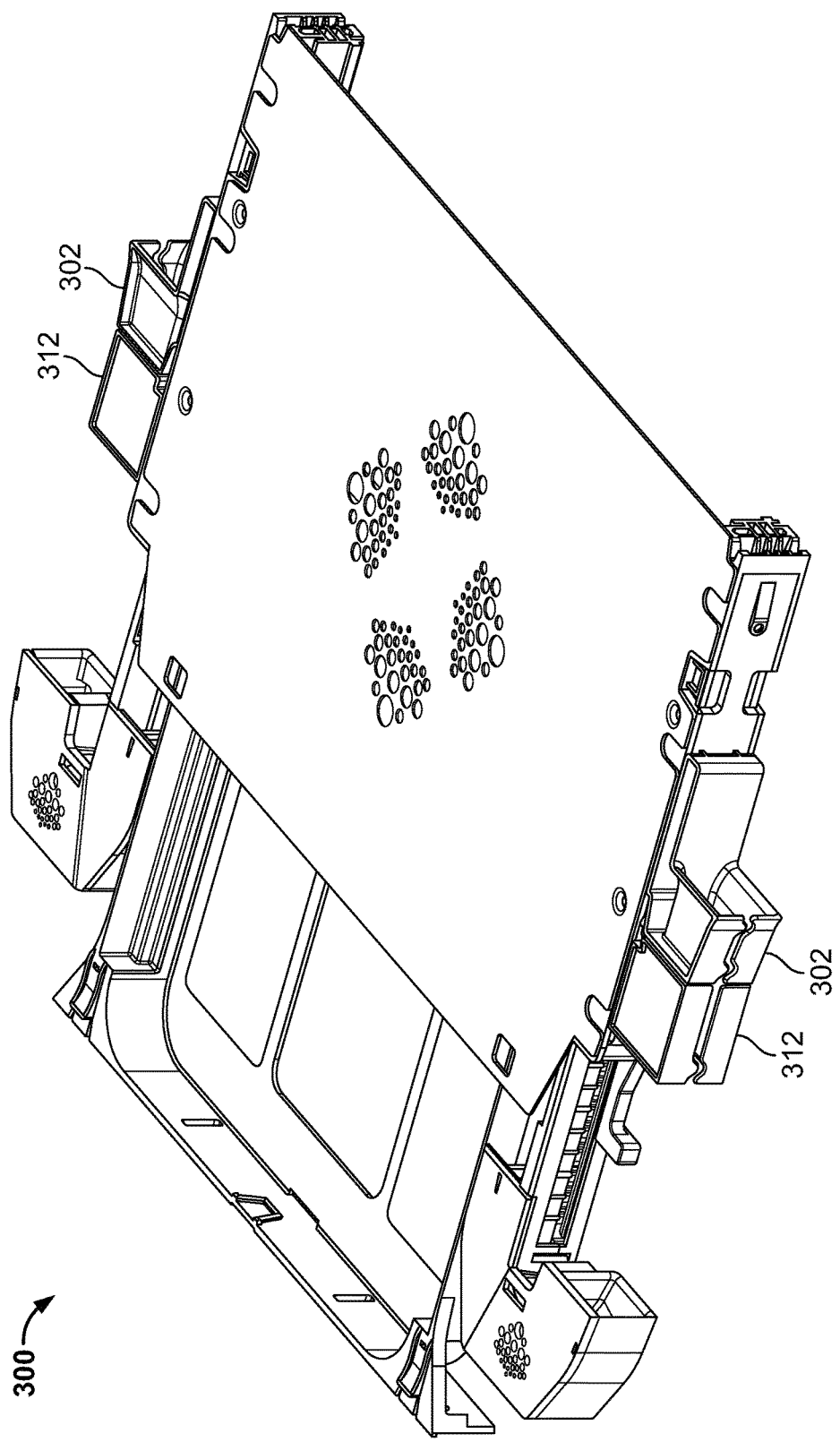
Figure 14:
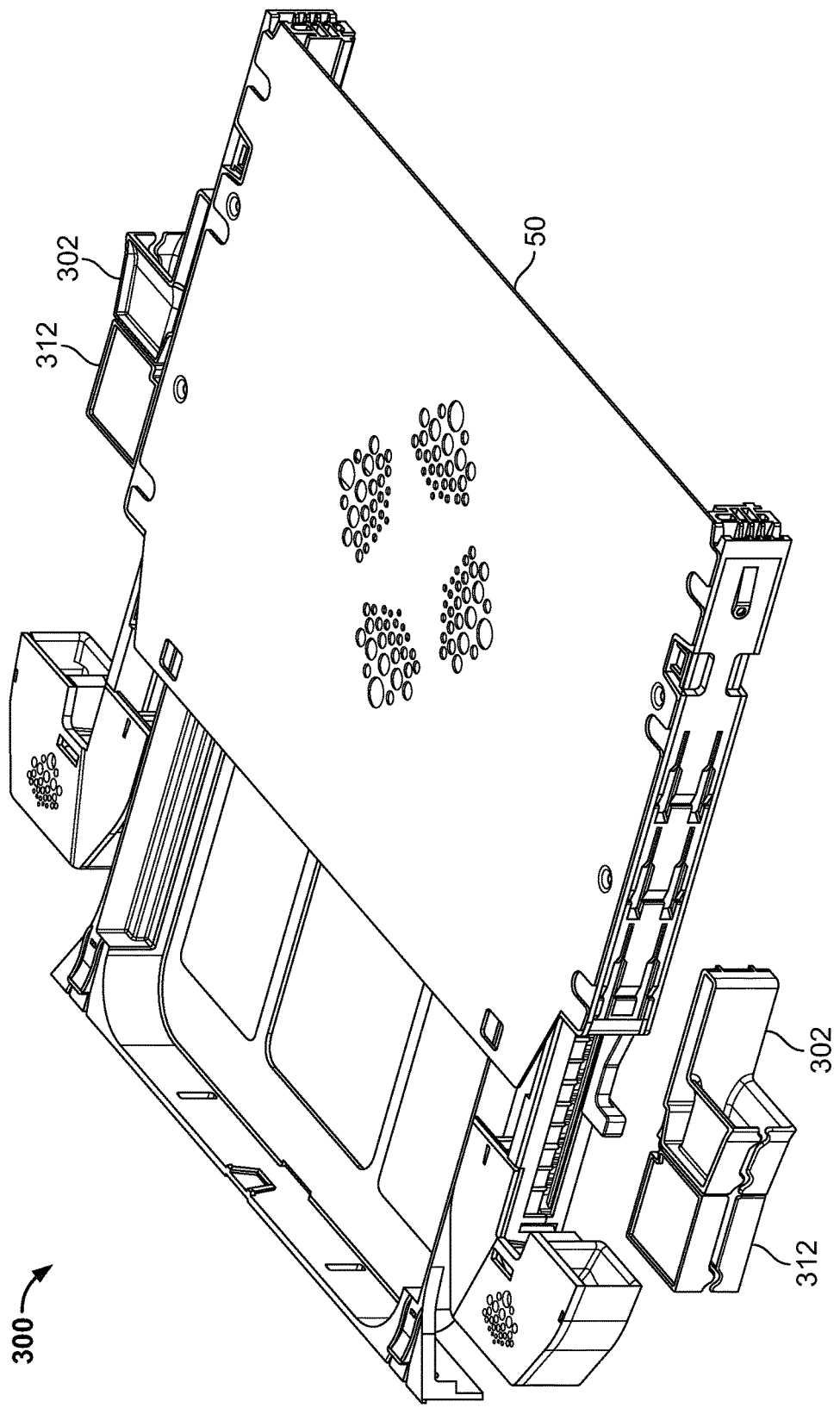
Figure 18:
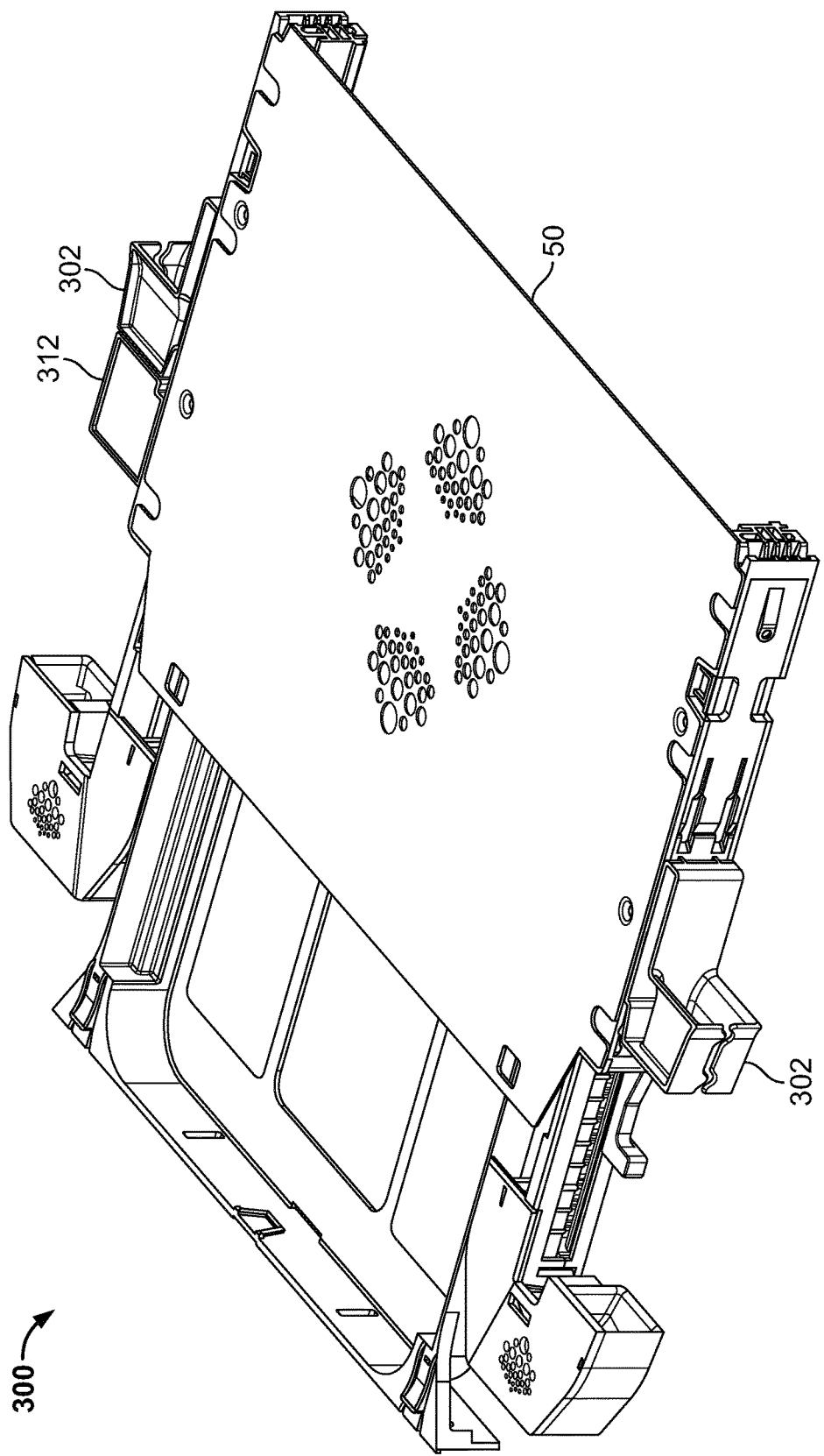
Figure 19:
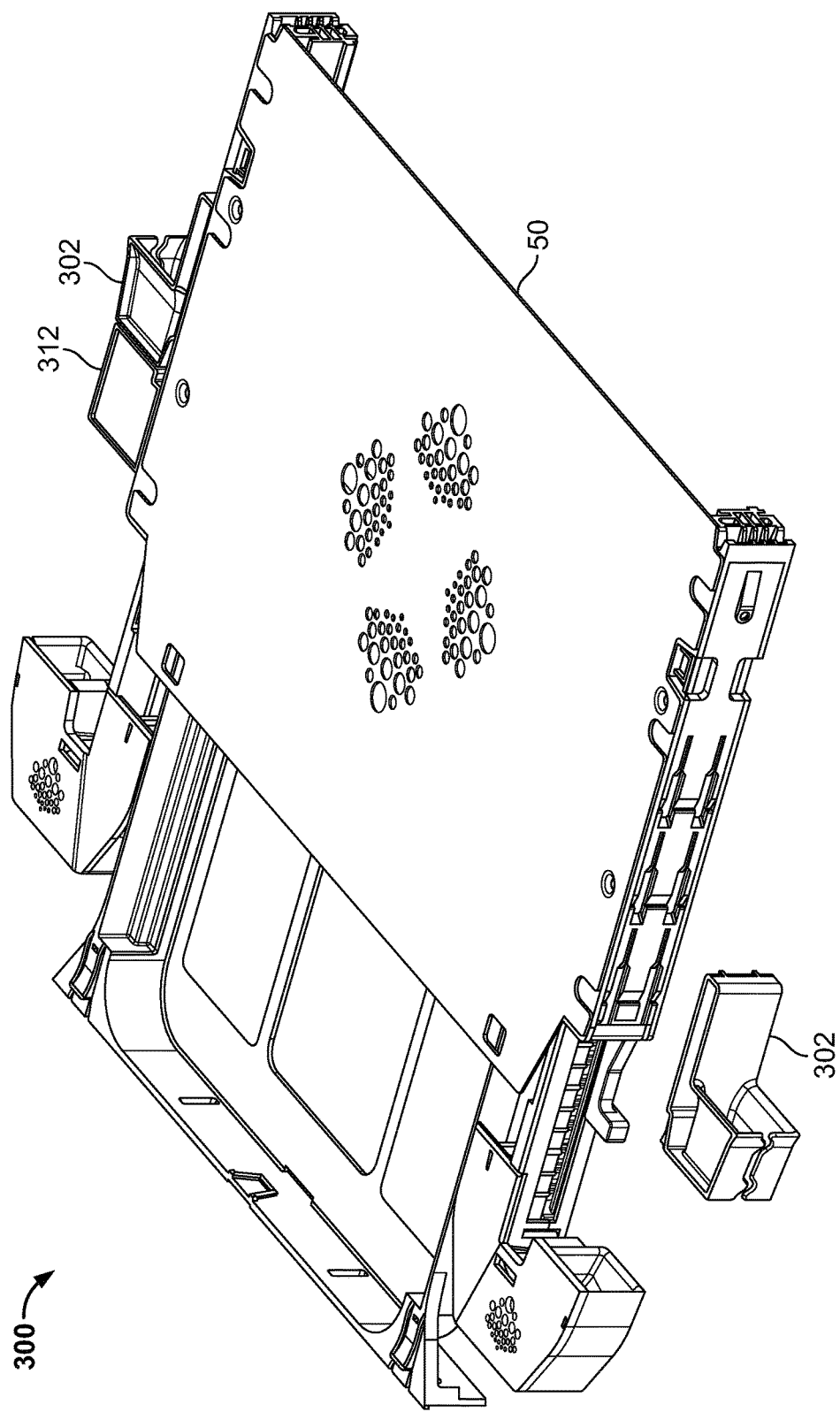
Figure 20:
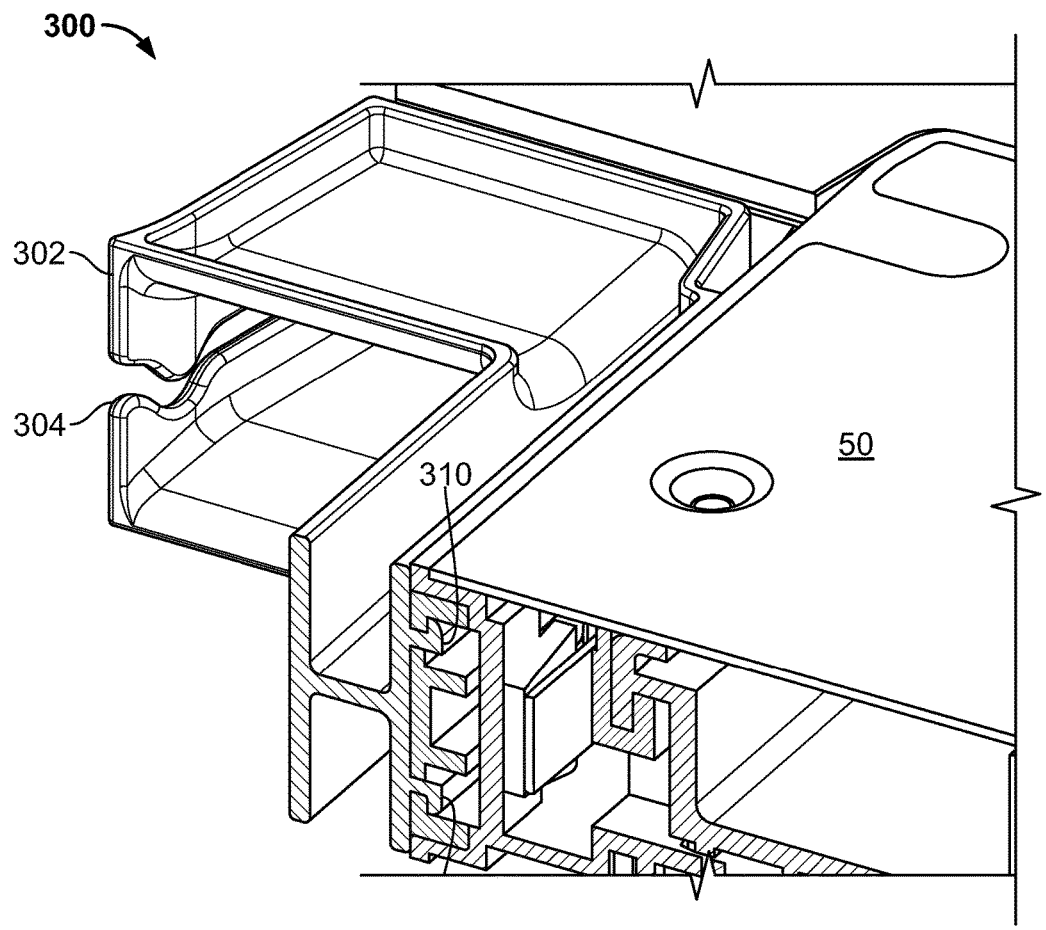
FIG. 20 is a partial cross-sectional view of the optical fiber distribution element in use with the cable support guide of FIG. 10.

Referring to FIGS. 8 and 9, an alternative embodiment of a cable management structure 200 is shown. As some of the features of the second embodiment are similar to the first embodiment, the above description of the first embodiment shown in FIGS. 1-7 is applicable to the second embodiment, and is incorporated into the description of the second embodiment by reference in its entirety. Where components are the same or substantially similar, like reference numbers will be used. Differences between the second and first embodiments will be discussed here, the primary differences being that the second embodiment includes cable support guides 202 that are directly attached to the optical fiber distribution element 50 rather than to a side channel frame 130.

As configured, the cable management structure 200 includes cable support guides 202 that have a cable pathway 204 that extends between a front face 206 and a rear face 208. In one aspect, pathway 204 is configured as a circuitous or tortuous pathway to further retain the cable within the support guide 202. Each cable support guide 202 is also provided with an engagement feature 210 such that the cable support guide 202 can be removably attached to one of the sides 52, 54 of the optical fiber distribution element 50.

In order to facilitate the same staggered orientation of the cable support guides 202 present in the first embodiment, each optical fiber distribution element 50 may be provided with a plurality of mounting arrangements 60. In one aspect, the distribution element 50 has a front end 56 and a rear end 58 extending between the first side portion 52 and a second side portion 54, wherein the plurality of mounting arrangements 60 are linearly spaced between the front end 56 and rear end 58. In the particular embodiment shown, the optical fiber distribution element 50 includes a first mounting arrangement 60a, a second mounting arrangement 60b, and a third mounting arrangement 60c.

During installation, an installer can simply select which of the mounting arrangements 60a, 60b, 60c should be selected as the mounting location for a cable support guide 202 in order to define the cable routing pathways 180, 182, and/or 184 as desired. As shown, cable support guide 202a is attached to mounting arrangement 60a, cable support guide 202b is attached to mounting arrangement 60b, and cable support guide 202c is attached to mounting arrangement 60c. In one aspect, the mounting arrangement 60 and engagement features 210 allow for a removable snap-fit type connection between the optical fiber distribution element 50 and the cable support guides 202. For example, mounting arrangement 60 is provided with a pair of narrowing slots 62 and a tab 64 that engage with corresponding legs 210a and the front face 206 of the cable support guide 102. However, the mounting arrangements 60 and engagement features 210 may be configured to engage each other with other types of attachment means, such as mechanical fasteners and/or permanent connection features. Although FIGS. 7 and 8 show an embodiment in which three vertically stacked optical fiber distribution elements 50 are provided with cable support guides 202 mounted in different locations, it should be understood that multiples of each attachment configuration can be provided in order to develop a support guide profile similar to that shown in FIG. 1 to provide distinct cable routing pathways, for example pathways 180, 182, 184.

Referring to FIGS. 10-20, another alternative embodiment of a cable management structure 300 is shown. As some of the features of this embodiment are similar to the prior embodiments described above, portions of the above description of FIGS. 1-9 are applicable to the further embodiment, and are incorporated into the description of the further embodiment by reference in its entirety. Where components are the same or substantially similar, like reference numbers will be used. Differences between the third and the first and second embodiments will be discussed here, the primary differences being that the third embodiment includes a cable support guide 302 which includes an extension, and is directly attached to the optical fiber distribution element 50, like cable support guide 202.

As configured, the cable management structure 300 includes cable support guides 302 that have a cable pathway 304 that extends between a front face 306 and a rear face 308. In one aspect, a pathway 304 is configured as a circuitous or tortuous pathway to further retain the cable within the support guide 302. Each cable support guide 302 is also provided with an engagement features 310 such that the cable support guide 302 can be removably attached to one of the sides 52, 54 of the optical fiber distribution element 50.

In order to facilitate the staggered orientation of the cable support guides 302, each optical fiber distribution element 50 may be provided with a plurality of mounting arrangements 60. An installer can install cable support guides 302 in a first position as shown in FIGS. 11-14. Cable support guides 302 can be mounted in a second position as shown in FIGS. 16-19. The cable support guide 302 of FIGS. 16-19 is shown in FIG. 15. This cable support guide 302 can be manufactured separately from the cable support guide 302 of FIG. 10. Alternatively, an extension 312 of cable support guide 302 is shown in FIG. 10 can be removed to form the cable support guide 302 of FIG. 15. The extension 312 can be removed by breaking off portions 314 and 316. Compare FIGS. 12 and 17 to see the staggering effect of the two different cable guides 302, one with the extension 312 and one without.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

PARTS LIST 10 optical fiber distribution rack
12 top portion
14 base portion
16 first side
18 second side
20 front side
22 back side
50 optical fiber distribution element
52 first side
54 second side
56 front end
58 rear end
60a first mounting arrangement
60b second mounting arrangement
60c third mounting arrangement
62 mounting slots
64 mounting tab
100 cable management structure
102 cable support guide
103 central opening
104 cable pathway
106 front face
108 rear face
110 engagement feature
110a mounting legs
110b latch tab
130 side channel frame
130a first end
130b second end
130c mounting slots
130d mounting aperture
132a first mounting arrangement
132b second mounting arrangement
132c third mounting arrangement
134 main body
136 mounting locations 180 first cable routing pathway
182 second cable routing pathway
184 third cable routing pathway
190 first plane
192 second plane
194 third plane
200 cable management structure
202 cable support guide
204 cable pathway
206 front face
208 rear face
210 engagement feature
210a mounting legs
300 cable management structure
302 cable support guide
304 cable pathway
306 front face
308 rear face
310 engagement feature
310a mounting legs
312 extension
314 portion
316 portion

What is claimed is:

1. A cable management structure for an optical fiber distribution rack comprising:
   (a) at least one optical fiber distribution element configured to be supported by the optical fiber distribution rack and having opposite first and second vertical side portions extending between a front end and a rear end wherein the first and second side vertical side portions includes a plurality of separated discrete mounting arrangements that are linearly spaced apart between the front end and the rear end, each of the discrete mounting arrangements defining a fixed mounting location; and
   (b) a first cable support guide defining a cable pathway extending in a direction parallel to the first and second side portions and between a front face and a rear face, the first cable support guide being configured for selective mounting to one of the plurality of mounting arrangements on the optical fiber distribution element first side portion, and configured to receive a cable extending from the at least one optical fiber distribution element; and
   (c) a second cable support guide defining a cable pathway extending in a direction parallel to the first and second side portions and between a front face and a rear face, the second cable support guide being configured for selective mounting to one of the plurality of mounting arrangements on the optical fiber distribution element second side portion, and configured to receive a cable extending from the at least one optical fiber distribution element.

2. The cable management structure of claim 1, wherein the first side and second side portions, of the optical fiber distribution element each has a first mounting arrangement, a second mounting arrangement, and a third mounting arrangement.

3. The cable management structure of claim 1, wherein the first and second cable support guides are each provided with an engagement feature for removable engagement with one of the plurality of mounting arrangements.

4. The cable management structure of claim 1, wherein the cable support guides include a removable portion in the form of an extension.

5. A cable management system comprising:
   (a) a distribution rack extending between a base portion and a top portion and having a front end, a back end, a first side, and a second side;
   (b) a vertical side channel frame mounted to the distribution rack first side and extending vertically in a direction between the distribution rack base and top portions, the side channel including a first plurality of discrete mounting arrangements located at an elevation above a second plurality of discrete mounting arrangements, the first plurality of mounting arrangements being recessed horizontally from the second plurality of mounting arrangements in a direction towards the distribution rack back end;
   (d) a plurality of first cable support guides defining a cable pathway, the plurality of first cable support guides being mounted to the first plurality of mounting arrangements; and
   (e) a plurality of second cable support guides defining a cable pathway, the plurality of second cable support guides being mounted to the second plurality of mounting arrangements;
   (f) wherein the plurality of first cable support guides is offset from the plurality of second cable support guides such that the first plurality of cable support guides is horizontally recessed from the second plurality of cable support guides in a direction towards the back end of the distribution rack.

6. The cable management structure of claim 5, wherein each of the at least one first and second cable support guides is configured to receive at least one optical fiber cable from an adjacent optical fiber distribution element.

7. The cable management structure of claim 6, wherein each of the each of the at least one first and second cable support guides is configured to be mounted on a side portion of the adjacent optical fiber distribution element.

8. The cable management structure of claim 5, wherein each of the at least one first and second cable support guides includes an engagement feature configured for removable engagement with one of the mounting arrangements of the first and second plurality of mounting arrangements.

9. The cable management structure of claim 5, further comprising:
   (a) a plurality of third cable support guides mounted to a plurality of third mounting arrangements on the side channel frame and defining a cable pathway extending between a from face and a rear face;
   (b) wherein the plurality of first and second cable guides are offset from the plurality of third cable support guides such that the first and second plurality of cable support guides are horizontally recessed from the third plurality of cable support guides in a direction towards the back end of the distribution rack.

* * * * *